United States Patent [19]
Kneipp

[11] Patent Number: 6,102,970
[45] Date of Patent: Aug. 15, 2000

[54] SYSTEM AND METHOD FOR OPTIMIZING A PROGRAM CONTAINING A NUMBER OF THE FLOWS THROUGH FLOW BRANCHES

[75] Inventor: Paul Kneipp, Nashua, N.H.

[73] Assignee: Davox Corporation, Westford, Mass.

[21] Appl. No.: 09/049,361

[22] Filed: Mar. 27, 1998

[51] Int. Cl.[7] ...................................................... G06F 9/45
[52] U.S. Cl. ................................ 717/9; 379/219; 379/258
[58] Field of Search .......................... 395/709; 358/402; 379/88.17, 88.22; 600/300; 706/53

[56] References Cited

U.S. PATENT DOCUMENTS

| | | | |
|---|---|---|---|
| 5,111,413 | 5/1992 | Lazansky et al. | 364/578 |
| 5,187,735 | 2/1993 | Herrero Garcia et al. | 379/88.17 |
| 5,214,688 | 5/1993 | Szlam et al. | 379/88.22 |
| 5,479,487 | 12/1995 | Hammond | 379/88.22 |
| 5,487,131 | 1/1996 | Kassatly et al. | 706/53 |
| 5,867,281 | 2/1999 | Nozoe et al. | 358/402 |
| 5,870,464 | 2/1999 | Brewster et al. | 379/219 |
| 5,897,493 | 4/1999 | Brown | 600/300 |

*Primary Examiner*—Tariq R. Hafiz
*Assistant Examiner*—Hoang-Vu Antony Nguyen-Ba
*Attorney, Agent, or Firm*—Bourgue & Associates, P.A.

[57] ABSTRACT

A system and method for optimizing a scripting program, such as utilized on a telephone system adapted to place and receive telephone calls includes a selectable script database having stored therein a plurality of selectable scripts each script having a unique script identifier. The system also includes at least one script branch definition table for routing a call through a logical series of scripts calculated to achieve a desired result. A script branch history record stores a sequence of selectable scripts accessed during a particular call and a call end table stores data on each terminated call. A branch script controller is also included, which is responsive to a predetermined event, to the script database and to the script branch definition table for selecting one of the selectable scripts to be accessed, for allowing the script message text to be provided to a party, for generating the indication of each script accessed and for generating the data on each terminated contact. The branch script controller is responsive to data input for modifying at least one of the destination script identifiers and/or the script text.

20 Claims, 7 Drawing Sheets

Selectable Script database 160

| Source Script Branch Identifier 166 | Script message text 164 |
|---|---|
| 1 | Do you own your own home? |
| 2 | Is your home more than ten years old? |
| 3 | Is the siding on your home the original siding? |
| 4 | Have you noticed your siding chipping, cracking, or warping? |
| 5 | Are you tired of painting your siding every 2 years? |
| 6 | Have you considered putting maintenance free vinyl siding on your home? |

FIG. 3

Script Branch Definition Table 120

| Source Script Branch Identifier 166 | Possible Script Branch Responses 126 | Destination Script Branch Identifier 122 |
|---|---|---|
| 1 | Yes | 2 |
|   | No | 10 |
| 2 | Yes | 3 |
|   | No | 12 |
| 3 | Don't Know | 40 |
|   | Yes | 4 |
|   | No | 14 |
| 4 | Don't Know | 50 |
|   | Yes | 5 |
|   | No | 16 |

FIG. 4

Script Branch History Record 140

| Call Record ID 134 | Script Branch Identifier 166 | Destination Script Identifier 122 | Time 141 | Duration 143 |
|---|---|---|---|---|
| 001 | 1 | 2 | 10:00:00 | :30 |
| 001 | 2 | 3 | 10:00:30 | :45 |
| 002 | 1 | 2 | 10:00:33 | :20 |
| 002 | 2 | 3 | 10:00:53 | :25 |
| 001 | 3 | 14 | 10:01:15 | 1:30 |

FIG. 5

Communication Start Table 130

| Call ID 134 | Form ID 135 | Record ID 136 | Start Time 137 |
|---|---|---|---|
| 001 | 01 | 258 | 08:02:00 |
| 002 | 06 | 032 | 08:02:48 |

FIG. 6

Communication End Table 135

| Call ID 134 | Agent ID 142 | Stop Time 144 | Termination Code 146 |
|---|---|---|---|
| 001 | 01 | 08:02:45 | 00 (No Answer) |
| 002 | 06 | 08:08:01 | A1 (yes Sale) |

FIG. 6A

Script Responce Quality Database 110

| Source Script Branch Identifier 166 | Script Identifier for a Positive Result 114 | Script Identifier for a Negative Result 115 | Script Identifier for a Neutral Result 116 |
|---|---|---|---|
| 1 | 2 | 10 | 30 |
| 2 | 3 | 12 | 40 |
| 3 | 4 | 14 | 50 |

FIG. 7

SYSTEM AND METHOD FOR OPTIMIZING A PROGRAM CONTAINING A NUMBER OF THE FLOWS THROUGH FLOW BRANCHES

FIELD OF THE INVENTION

This invention relates to computer programs and more particularly, to a system and method for modifying the flow through various possible branches in a program, for optimizing the performance of the program.

BACKGROUND OF THE INVENTION

Computer programs containing many possible "branches" are now well known. Most often, the "path" through the branches are determined by the results obtained in one or more earlier branches. Telephony call centers are one example of a use of a program containing one or more branches. Such programs used in the Telephony call center industry are often "scripting" programs since the various branches contain "scripts" (prepared phrases to be read over the phone).

Telephony call centers are generally used to control in-bound call distribution and outbound call activities for organizations such as banks, credit card collection agencies, and telemarketing companies, among others. Since such telephony call centers generally utilize a script for their telephone agents to read and follow for each call, there will be different scripts for certain or each type of telephony call center activity (call campaigns) currently in use by each telephone call center.

For example, a call campaign for a credit card company collecting past due accounts will need a very different script than a call campaign selling home improvement products. As each agent is connected to a particular call, which may be either an in-bound or an outbound call, a telephony call center management system of the call center will provide the agent with a script to follow for that particular telephone call.

The scripting program will provide an agent with the scripts containing dialog and questions to ask the called party. In addition, the scripting program will generally have a "branching" capability which will direct the telephone call agent to different questions or text (scripts) based on the party's response to a previously asked question.

When using a call script, the telephone call agent will ask the called party a question. The response will be entered into the call center system by the agent, such as by depressing a predetermined button on the agent's keyboard or by selecting the proper response from a list using a mouse or other pointing device (input code) and depending upon the response from the party, the scripting program will then determine and display the text of the next branch of the scripting program based upon the answer given to one or more previous questions.

Although great effort goes into developing the scripting program text and scripting branch flow, there are times when one or more branches of the scripting program will fail to produce the desired results. A script branch may fail in several ways. The scripting program may fail to reach a satisfactory conclusion in that it may fail to reach the end of the scripting program due to the called party hanging up, or it may reach the end of the scripting program but without the desired results being obtained, i.e., no sale was completed.

There is no capability in the current state of the art in telephony call center scripting program management systems to either monitor the status and flow of information through a scripting program, or to modify the scripts or the script branching in a scripting program used by call center agents.

Accordingly, it would be extremely useful for a call center supervisor to have before him or her information pertaining to the results achieved by the scripting program. Information such as which particular branch(es) of the scripting program are leading to paths (branches) which ultimately lead to desired results being obtained, and which branches are leading to paths which are not obtaining satisfactory results would be very useful in order to measure the effectiveness of the scripting program. The supervisor could then be given the capability to modify the scripting program (the script text itself or the script program branching) in an effort to achieve more desirable results.

A supervisor should also be able to monitor the branch activity dynamically, i.e., in real time, in order to make the most effective use of this information. Also, a supervisor would like to be able to dynamically modify the scripting program in order to minimize the time in which the scripting program is operating inefficiently. In this way, a supervisor could have continuous feedback as to the effectiveness of the scripting program, and any modifications made to it.

Accordingly, what is needed is a system and method to monitor and modify a scripting or other similar "branching" type program used by, for example, telephone call center agents or similar environments.

SUMMARY OF THE INVENTION

In accordance with the present invention, a system and method for optimizing a scripting program such as for call campaigns used by a telephony system, is provided. The system includes a plurality of selectable scripts, each of which provides a predetermined message text, such as a question, which would be used by, for example, a call agent in a telephone call campaign. Each selectable script includes a unique identification number. The system further includes a script branch definition table, which includes one or more user modifiable script branch definitions. Each script branch definition is linked to a script branch identification number for a next logical script message in response to a predetermined response to the previous message text.

Also included in the system are script branch history records and connected party termination history records, which, respectively, include an indication of each accessed selectable script and data on each terminated contact using said scripting program.

The system is controlled by a branch script controller, which is responsive to predetermined events, such as the possible caller or called party responses to script messages, the selectable script database and to the script branch definition table for selecting a selectable script and for allowing the script message to be provided to the party. The controller also generates an indication of each accessed script and data on each terminated contact. Finally, the controller is responsive to user input for modifying destination script identifiers in order to optimize the results of a call campaign using the system.

BRIEF DESCRIPTION OF THE DRAWINGS

These and other features and advantages of the present invention will be better understood by reading the following detailed description, taken together with the drawings wherein:

FIG. 3 is a tabular representation of scripting data;

FIG. 4 is a tabular representation of a script branch definition table;

FIG. 5 is a tabular representation of data contained in the script branch history record;

FIG. 6 is a tabular representation of data contained in the call start table;

FIG. 6A is a tabular representation of data contained in the call end table;

FIG. 7 is a tabular representation of data contained in the script response quality record.

DETAILED DESCRIPTION OF THE PREFERRED EMBODIMENT

Figure 1:
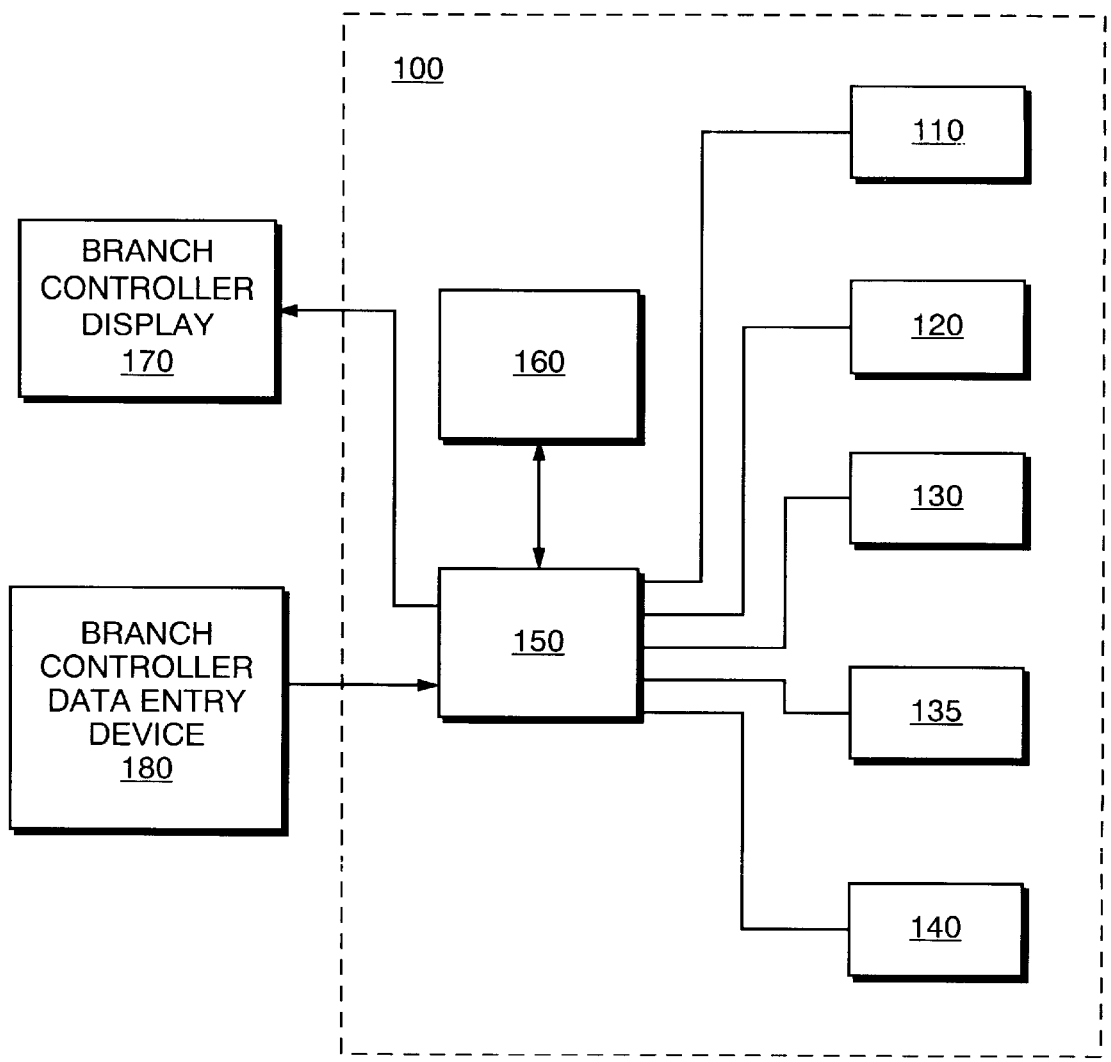
FIG. 1 is a schematic block diagram of the system for optimizing a script program containing a plurality of branches according to the present invention.
Figure 2:
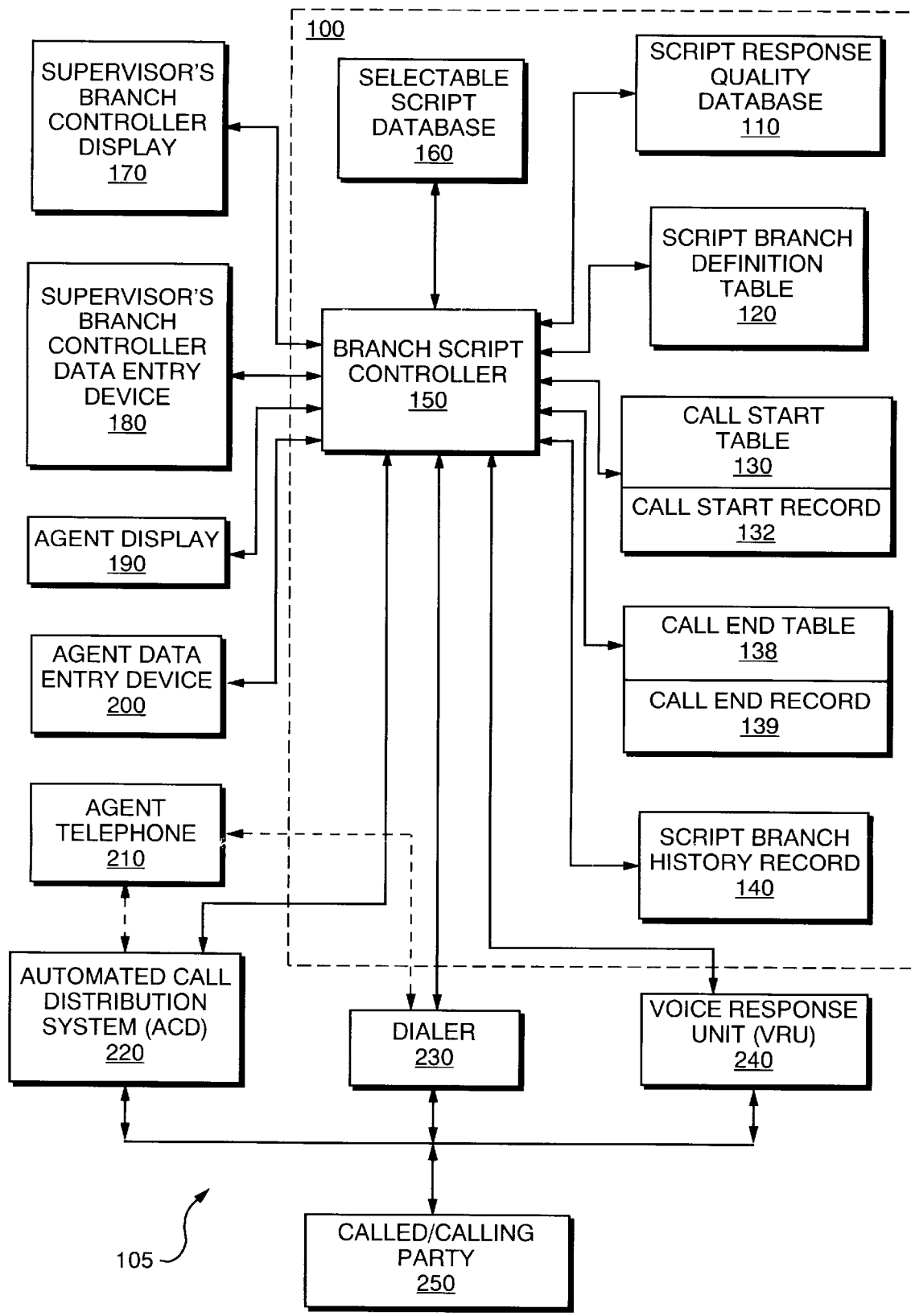
FIG. 2 is a schematic block diagram of the system of FIG. 1, which is adapted to be used with a computer telephony system.

A system 100, FIGS. 1 and 2, according to the present invention capable of optimizing a scripting branch program is disclosed. FIG. 1 discloses a universal branch scripting optimization system, which includes a branch script controller 150, a selectable script database 160, a script response quality database 110, a script branch definition data table 120, a script branch history record 140, a call start table 130 and a call end table 135. System 100 is monitored by a supervisor via a branch controller display 170 and may be modified by the supervisor via branch controller data entry device 180 as needed.

FIG. 2 shows a system 100, which is adapted to be used in conjunction with a computer telephony system 105 to integrate a scripting program with inbound and outbound telephone calls. The following description will explain the system 100 in conjunction with a computer telephony system for exemplary purposes, although this is not a limitation of the present invention.

Initially a supervisor, will enter data into the script response quality database 110, via a branch controller data entry device 180 such as a keyboard, which will provide the initial data as to the "quality" of a response to a particular selectable script message from the selectable script database 160.

The "quality" of a response is assigned by the supervisor as "positive" responses, that is, a response desired by the program (for example a "yes" answer to a questions "Do you want more information?"); a negative response, that is, a response not desired by the program (for example a "no" response to the questions "Do you want more information?"); a neutral response, that is, a response of yet undetermined desirability (for example, a response of "maybe" to the question "Do you want more information?").

An interested party is contacted by (in the case of an outbound call), or contacts (in the case of an inbound call), a telephone call center and an associated telephony management system. The telephony management system will connect the interested party, either through an automatic call distribution system (ACD) 220, or a dialer 230, to an agent telephone 210.

In the alternative, the principles of the disclosed invention apply to other means of communication between a call center agent and an interested party. For example, an advanced call center could establish communications with an interested party in response to a query initiated by the interested party to the call center via a wide area network, such as the global computer network commonly known as the Internet. In this embodiment, script messages and responses would be displayed on the agent's and the interested party's data terminals and communications would be via data entry devices and displays instead of oral recitations of script messages and spoken responses over voice telephone lines.

Each time a call is placed (i.e. a telephone number is dialed) a call start record 132 is created. At the time the call start record is created, the branch script controller 150 generates and assigns a unique integer value, or call ID 134, FIG. 5, to the call transaction being initiated. This ensures that no matter how many times the same telephone number is dialed, the call ID itself is unique. This individualizes each dial attempt during a calling period, such as a day, week, month or even an entire call campaign.

The branch script controller 150 also adds the newly created call start record 132 to the call start table 130. Other data which may be included with each call ID 132 in the call start table 130 includes: a form ID 135, which is a unique integer value assigned to a particular set of screen forms which are to be used during the call; a record ID 136, which is an integer value that uniquely identifies the "call record" being accessed; and the call processing start time 137 which is a date-time value that stores the date and time a call attempt started.

A "call record" is a record containing information about a party being contacted. For example, a call record would include the name of the party being contacted, the party's telephone number, address and the like. Call records are analogous to individual listings on a mailing list. Each listing or call record is assigned a unique record ID 136 at the time the call record is entered into the telephony management system.

When a call ends, a call termination record 139, FIG. 6A, is created and inserted into the call end table 138. Each call termination record 139 includes: the call ID 134 of the terminated call; an agent ID 142, which is an integer value that uniquely identifies the call center agent who handled the call; a stop time 144 which, like the call start time described above, is a date-time value that stores the date and time the call was ended (call duration can be determined by subtracting the start time from the end time); and a termination code 146 which is an alphanumeric value that the agent entered in response to the end of the particular call.

Once connected, the branch script controller 150 will then, based on the form ID 135, select an initial selectable script message 164 (FIG. 3) from the selectable script database 160, and display the selected script message text 164 on the agent display 190. The agent will communicate the selectable script message text 164 to the calling/called party and communicate the response of the party 250 to the branch script controller 150, via the agent data entry device 200. As indicated earlier, communications may be oral communications over voice telephone lines or electronic data communications exchanged between agents' and interested parties' computer terminals over a wide area network.

The branch script controller 150 will accept the input from the agent data entry device 200 and, using the data input and the script branch definition data table 120, look up the next selectable script message text from the selectable script database 160 based on this response input.

The agent data entry device 200, as will be appreciated by one skilled in the art, may be a keyboard, an audio input device and speech recognition system, a voice response unit, or a pointing device such as a mouse used in conjunction with a graphical users interface (GUI).

As each selectable script message text 164 is selected from the selectable script database 160, the branch script controller 150 will store the selectable source script branch identifier 166 and the other associated data in a script branch history record 140, FIG. 5.

The present invention contemplates the use of a supervisor display 170 and a supervisor data entry device 180. The supervisor display 170 may be any terminal capable of displaying this data in a graphical or textual format. In the preferred embodiment of the present invention, the supervisor display 170 is a data terminal with a graphical user interface which is capable of displaying data in a color format to aid the supervisor in easy interpretation of the data.

The supervisor interprets the data displayed on the supervisor display 170 and then may modify the text of one or more of the selectable script message text 164 in the selectable script database 160. The supervisor may also modify the data in the script branch definition data table 120, FIG. 4. In modifying the data in the script branch definition database 120, the supervisor may change the destination script branch identifier 122 for any given source script branch identifier 166. In this way, the supervisor may attempt to guide the call agent down a path of selectable script messages and questions 164 which is more likely to end in a positive result.

A representation of selectable scripts stored in the selectable script database 160 is provided in FIG. 3. Each selectable script message or question text is provided with a script branch identifier 166. These script messages or questions 164 contained in the selectable script database 160 are designed to elicit from the called or calling party 250 information which the agent will then use to attempt to achieve the purpose of the telephone contact. As is appreciated by one skilled in the art, the potential form of selectable script message text 164 is as varied as the potential objectives of each telephone contact. As is shown in FIG. 3, a sample series of questions 164a–164f are provided which would enable an agent to attempt to sell to an interested party new vinyl siding for their home. As such, each question is provided with a simplified choice of answers (yes, no, maybe, don't know) which represent the possible responses to the asked question.

As shown in FIG. 4, the script branch definition table 120 contains data for each source script branch identifier 166, each source script branch possible responses 126, and a destination script branch identifier 122. The agent will enter the appropriate input via the agent data entry device 200, based on the party's response to the just communicated selectable script message or question text 164. Alternatively, when the party and the agent are in data communications over a network, the party's response may be directly entered into the system, which would eliminate the need to have the agent input the party's response into his or her terminal.

The branch script controller 150, will look in the script branch definition table 120 for the source script branch identifier 166 and the input source script branch response 126, and will read from the table 120 the destination script branch identifier 122. This will enable the branch controller 150 to retrieve the next selectable script message or question text 164 from the selectable script database 160 based on the destination script branch identifier 122. The branch script controller 150 will then display the next selectable script message or question text on the agent display 190.

As shown in FIG. 5, the script branch history record 140 contains data on each selectable script message or question text selected from the selectable script database 160. The data in the script branch history record will contain information such as the call record ID 134, the input or source script branch identifier 166, the output or destination script branch identifier 122 of the next selectable script message or question text, the time 141 processing of the input branch identification began, and the duration of the time 143 spent on a particular input source branch identifier.

As shown in FIG. 6, the call start table 130 contains data on each attempt at a telephone contact with an interested party. The call start table 130 will contain information such as the call ID 134, the form ID 135, the record ID 136 and the start time 137. Similar to the call start table 130, the call end table 135 is shown in FIG. 6A. The call end table 135 stores call termination records 146, each of which includes a call ID 134, an agent ID 102, a stop time 144 and a termination code 146.

As shown in FIG. 7, the script response quality database 110 contains exemplary data entries 111–113 for each selectable script message text by source script branch identifier 166. The data includes the selectable script identifier 166, one or more destination script identifiers 114 which the system considers to be a positive response from the called/calling party; one or more destination script identifiers 115 which are considered to be a negative response from the called/calling party; and one or more script identifiers 116 considered to be a neutral response from the called/calling party.

Figure 8:
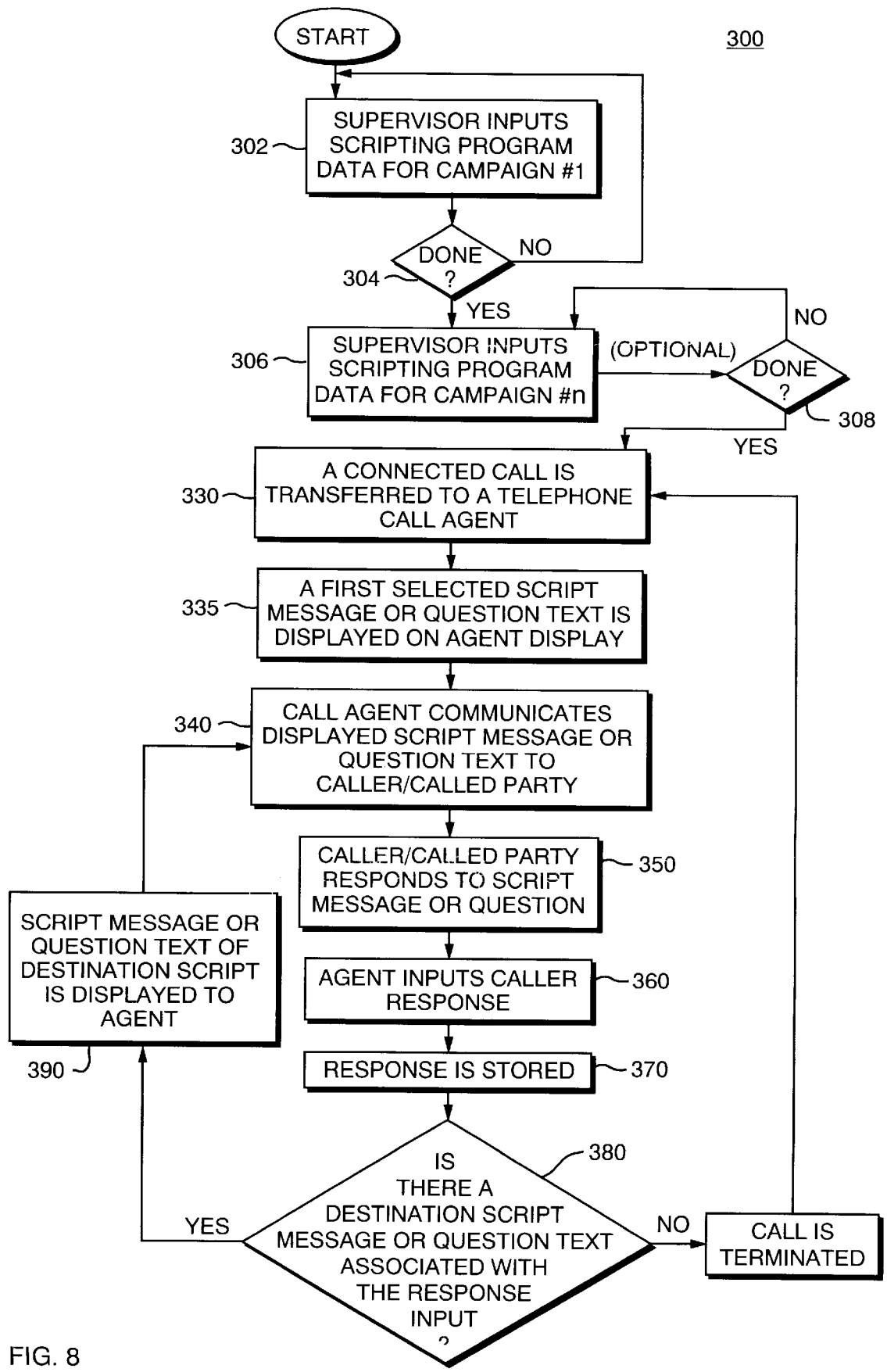
FIG. 8 is a flowchart diagram of the method for optimizing a script program containing a plurality of branches according to the present invention.

FIG. 8 is a flow chart 300 illustrating the steps of a method for optimizing a script program containing a plurality of script branches. Steps 302–308 allow the supervisor to enter the scripting program data for one or more call campaigns. Next, a connected call is transferred to a telephone call agent, step 330 and at step 335, the first selected script message or question text is displayed on the agent display. The telephone call agent next communicates the selected script message or question text to the called/calling party, step 340. The called/calling party then responds to the selected script message or question text, step 350, while at step 360, the agent inputs the party's response via the agent data entry device 200. At step 370, the data associated with the previous script message which may comprise the script message and the response elicited, is stored in the script branch history record 140.

Since each selected script message will be designed in a manner such that there will be a finite number of possible responses, such as a "yes" or "no", each possible response will itself have associated with it a destination script identifier, which will be the script identifier associated with the next script message text to be utilized. By entering the called/calling party's response, the system will look up the destination script branch identifier 122 in the script branch definition table 120, step 380 and will retrieve and display the script message or question text on the agent display 190, step 390. The telephone call agent will then communicate the next selected script message or question text to the called/calling party, step 340. Steps 350–370 will then be repeated.

Step 380 determines whether the call connection will be terminated after the telephone call agent communicates the selected branch script message or question text to the called/calling party. If the call is terminated, a call termination record is created and is added to the call end table and the call agent is again ready to receive a phone call, step 330. If the call is to continue, the next step is that the called/calling party responds to the just communicated message or question text, step 350.

A system supervisor is provided with a supervisor branch controller display 170, which allows the supervisor to monitor one or more calls simultaneously. The supervisor is provided with information regarding the in process calls all along the call path. Based on the information received by the supervisor, the supervisor may modify the script branch definition table or one or more script messages as appropriate in order to improve the results of the particular call campaign.

Modifications and substitutions by one of ordinary skill in the art are considered to be within the scope of the present invention which is not to be limited except by the claims which follow.

What is claimed is:

1. A system for optimizing a scripting program, said system comprising:
   a plurality of selectable scripts stored in a selectable script database, at least one of said plurality of selectable scripts comprising a predetermined message including at least one question having at least two possible responses, each said plurality of selectable scripts having a unique selectable script identifier;
   at least one script branch definition table including a plurality of user modifiable script branch definitions, each of said plurality of user modifiable script branch definitions including at least a destination script branch identifier corresponding to one of said selectable scripts for each of said at least two possible responses to said question of each predetermined message of each of said plurality of selectable scripts;
   a script branch history record including an indication of each accessed selectable script;
   a communication start table for storing data on each communication record handled;
   a communication end table for storing data on each communication record terminated; and
   a branch script controller, cooperative with said selectable script database and to said at least one script branch definition table, for selecting one of said plurality of selectable scripts to be accessed, for allowing said predetermined message to be provided, for accepting a response to said predetermined message, for generating said indication of each accessed selectable script, for generating data stored in said communication start table and said communication end table, and responsive to data input, for modifying at least one of said destination script branch identifiers of at least one of said plurality of user modifiable script branch definitions.

2. The system of claim 1 wherein said predetermined message is displayed on an agent display screen and orally spoken by an agent to a connected party via a data connection and telephone voice connection.

3. The system of claim 1 wherein said predetermined message is communicated to and displayed on a connected party display via a wide area network connection.

4. The system of claim 1 wherein said predetermined message is transmitted to a connected party by a voice response unit to said connected party.

5. The system of claim 2 wherein a branch script controller is responsive to a predetermined event, and wherein said predetermined event includes said response to said predetermined message which is provided orally from said connected party to an agent and entered by said agent via an agent data entry device.

6. The system of claim 3 wherein a branch script controller is responsive to a predetermined event and wherein said predetermined event includes said response to said predetermined message which is provided from said connected party to an agent display over said wide area network connection.

7. The system of claim 5 wherein said data entry device is a keyboard.

8. The system of claim 5 wherein said predetermined event is a response from the connected party by touch tone telephone codes.

9. The system of claim 1 further comprising a script response quality database, responsive to said branch script controller, for storing user input data describing the quality of each response for each of said plurality of said selectable scripts; and
   wherein said branch history file is responsive to said user input data of said scrip t response quality database, for storing said user input data associated with each of said selected scripts of said plurality of said selectable scripts.

10. The system of claim 1 wherein at least one of said plurality of selectable scripts includes user definable and modifiable script message.

11. The system of claim 10 wherein said branch script controller is responsive to data input, for modifying said modifiable script message of at least one of said plurality of selectable scripts.

12. A method for optimizing a scripting program for conducting communication campaigns, said met hod comprising the steps of:
   a) entering scripting program data for at least one communication campaign;
   b) transferring a party to communicate with an agent;
   c) selecting a script message from said scripting program data;
   d) communicating said script message to said party and receiving a response to said script message from said party;
   e) inputting said party's response to said script message;
   f) storing data associated with said script message in a script branch history record;
   g) looking up, in a script branch definition table, a destination script identifier associated with said party's response to said script message and retrieving a next script message from said scripting program data associated with said destination script identifier;
   h) repeating steps d) through g until said communication is terminated; and
   i) upon termination of said communication, storing data associated with said communication in a communication end table.

13. The method of claim 12 further comprising modifying said script branch definition table to improve the results of the communication campaign.

14. The method of claim 12, further comprising the step of modifying one or more script, messages in response to a review of said data associated with said communication stored in said communication end table to improve the results of the communication campaign.

15. The method of claim 13, wherein said script branch definition table is modified in response to a review of said communication end table.

16. The method of claim 15 wherein at least one destination identifier in said script branch definition table is modified in response to a review of said communication end table.

17. A computer-implemented method for optimizing a query scripting campaign, said method comprising the steps of:

a) storing a plurality of selectable query scripts in a selectable query script database, at least one of said plurality of selectable query scripts comprising a predetermined message including at least one question having at least two possible responses, each said selectable query script having a unique selectable query script identifier;

b) assigning a user modifiable script branch definition to each selectable query script, each said user modifiable script branch definition including at least a destination script branch identifier corresponding to one of said plurality of selectable query scripts stored in said selectable query script data base for each of said at least two possible responses to said question of each predetermined message of each of said plurality of selectable query scripts;

c) storing each user modifiable script branch definition in a script branch definition table;

d) access sing one of said stored plurality of selectable query scripts;

e) establishing communications with a party;

f) communicating said accessed selectable query script to said party;

g) storing an indication of each said accessed selectable script communicated to said party in a script branch history record;

h) accepting an input indicative of a response to said communicated selectable query script;

i) searching said script branch definition table and retrieving said destination script branch identifier corresponding to said response to said communicated selectable query script;

j) accessing a subsequent query script from said stored plurality of query scripts, said subsequent query script associated with said destination script branch identifier corresponding to said response to said communicated selectable query script;

k) communicating said subsequent query script to said party;

l) modifying said query scripting campaign by changing said destination script branch identifier associated with said response to a different one of said stored plurality of query scripts; and m) repeating steps f through 1 until communications with said party are terminated.

18. The method of claim 17 wherein said query scripting campaign is conducted on a telephone network.

19. The method of claim 17 wherein said query scripting campaign is conducted on the Internet.

20. The method of claim 17 wherein said selectable scripts are provided to said user in a voice transmission.

* * * * *